United States Patent
Boulton

(10) Patent No.: US 9,977,262 B2
(45) Date of Patent: May 22, 2018

(54) ELECTROCHROMIC LENSES AND METHODS OF FABRICATING THE SAME

(71) Applicant: Honeywell International Inc., Morristown, NJ (US)

(72) Inventor: Jonathan Boulton, North Attleboro, MA (US)

(73) Assignee: HONEYWELL INTERNATIONAL, INC., Morristown, NJ (US)

(*) Notice: Subject to any disclaimer, the term of this patent is extended or adjusted under 35 U.S.C. 154(b) by 0 days. days.

(21) Appl. No.: 14/629,635

(22) Filed: Feb. 24, 2015

(65) Prior Publication Data

US 2015/0261009 A1     Sep. 17, 2015

Related U.S. Application Data

(60) Provisional application No. 61/951,753, filed on Mar. 12, 2014.

(51) Int. Cl.
| | |
|---|---|
| *G02C 7/10* | (2006.01) |
| *G02C 7/02* | (2006.01) |
| *G02C 7/08* | (2006.01) |
| *G02F 1/155* | (2006.01) |
| *G02F 1/161* | (2006.01) |
| *C09J 7/02* | (2006.01) |

(52) U.S. Cl.
CPC ............ *G02C 7/101* (2013.01); *C09J 7/026* (2013.01); *G02C 7/022* (2013.01); *G02C 7/083* (2013.01); *G02C 7/104* (2013.01); *G02F 1/155* (2013.01); *G02F 1/161* (2013.01); *C09J 2201/122* (2013.01); *C09J 2203/326* (2013.01); *C09J 2400/123* (2013.01); *G02C 2202/16* (2013.01); *Y10T 428/1476* (2015.01)

(58) Field of Classification Search
CPC ........ G02C 7/101; G02C 7/104; G02C 7/022; G02C 7/083; G02C 7/086; G02C 7/088; G02C 7/10; G02F 1/155; G02F 2001/1552; G02F 2001/1555; G02F 2001/1557; C09J 7/026; C09J 7/0264
USPC ......... 351/159.61, 44, 159.39, 159.49, 159.6
See application file for complete search history.

(56) References Cited

U.S. PATENT DOCUMENTS

| | | | | | |
|---|---|---|---|---|---|
| 5,471,036 | A | * | 11/1995 | Sperbeck | ............... H05B 3/36 2/435 |
| 5,471,554 | A | * | 11/1995 | Rukavina | ............... C08J 7/045 359/265 |

(Continued)

*Primary Examiner* — Jordan Schwartz
(74) *Attorney, Agent, or Firm* — Barlow, Josephs & Holmes, Ltd.

(57) ABSTRACT

The present disclosure provides a method of constructing an electrochromic lens which simplifies the steps of applying the electrochromic electrode coatings onto the lens elements. An electrochromic lens is constructed by applying an electrochromic electrode film onto the inner surfaces of facing lens elements and then sandwiching an electrochromic material between the lens elements. The films include a release liner having a release coating, an adhesive coating overlying the release coating of the release liner, an indium tin oxide (ITO) coating overlying the adhesive coating, and an active electrochromic electrode (EE) coating or active electrochromic electrode (ECE) coating overlying said ITO film coating. The release liner is removed and the remaining layers of the film are adhered to the lens.

3 Claims, 6 Drawing Sheets

(56) References Cited

U.S. PATENT DOCUMENTS

| | | | | |
|---|---|---|---|---|
| 2010/0296047 | A1* | 11/2010 | Chou | G02C 7/02 351/159.01 |
| 2012/0094037 | A1* | 4/2012 | Banba | C09J 7/00 428/1.5 |
| 2012/0287395 | A1* | 11/2012 | Tamura | C03C 27/10 351/49 |
| 2013/0004749 | A1* | 1/2013 | Hao | B32B 7/10 428/201 |
| 2013/0011672 | A1* | 1/2013 | Okamoto | C08F 120/18 428/355 EN |
| 2013/0120821 | A1* | 5/2013 | Chandrasekhar | G02F 1/1506 359/265 |
| 2013/0293825 | A1* | 11/2013 | Trajkovska | G02F 1/153 351/44 |
| 2014/0043667 | A1* | 2/2014 | Bergh | G02F 1/153 359/265 |
| 2015/0004407 | A1* | 1/2015 | Higashi | C09J 139/04 428/355 CN |
| 2015/0075706 | A1* | 3/2015 | Cheng | H01L 21/6835 156/247 |
| 2015/0109651 | A1* | 4/2015 | Branda | B32B 17/10486 359/238 |
| 2015/0158259 | A1* | 6/2015 | Yamamoto | G02C 7/12 264/1.32 |
| 2015/0219931 | A1* | 8/2015 | Grasso | G02C 7/12 351/159.56 |
| 2016/0026061 | A1* | 1/2016 | O'Keeffe | G02F 1/167 359/296 |
| 2016/0289513 | A1* | 10/2016 | Behling | B05D 3/06 |

\* cited by examiner

ELECTROCHROMIC LENSES AND METHODS OF FABRICATING THE SAME

This application is a non-provisional of, and claims the benefit of, U.S. Application No. 61/951,753, filed Mar. 12, 2014, the entire contents of which is incorporated herein by reference.

BACKGROUND

The present disclosure relates to electrochromic eyewear and more particularly to electrochromic lenses and methods of fabricating the same.

Electrochromic panels, in which the transmission of light can be controlled either by the user or by a sensor are known. Electrochromism is based on chemical species that can be electrochemically switched between different colors (different oxidation states). The color change preferred for eyewear is typically between a transparent state and a color. Electrochromic technology is a preferred technology for eyewear because of its low voltage and power requirements.

SUMMARY

The present disclosure provides a method of constructing an electrochromic lens which simplifies the steps of applying the electrochromic electrode coatings onto the lens elements.

An electrochromic lens is constructed by applying electrochromic electrode films onto the inner surfaces of facing lens elements and then sandwiching an electrochromic electrolyte material between the lens elements. The films include a release liner having a release coating, an adhesive coating overlying the release coating of the release liner, an indium tin oxide (ITO) coating overlying the adhesive coating, and an active electrochromic electrode (EE) coating or active electrochromic counterelectrode (ECE) coating overlying said ITO film coating. The release liner is removed and the remaining layers of the film are adhered to the lens elements. The lens elements are assembled with the electrochromic electrolyte material to form a completed lens.

The completed lens is then assembled with an eyewear frame, and provided with a power source, an electrical circuit connecting the power source with the electrochromic electrodes, and a switch for selectively energizing the lens to modify the transmittance of the lens.

In a first exemplary embodiment, an electrochromic lens includes two optical lenses, each supporting an indium tin oxide (ITO) coating that is adhered to an inner surface of each lens by an adhesive layer. On the first lens, an active electrochromic electrode (EE) coating overlies the ITO coating. On the second lens, an active electrochromic counterelectrode (ECE) coating overlies the ITO coating. An electrochromic electrolyte material is sandwiched between the EE and ECE coatings to complete the lens construction and an electrical circuit connects the power source to the EE and ECE coatings. In one version, the electrochromic electrolyte material is a film material, while in another version the electrochromic electrolyte material is a gel or liquid that requires the use of a gasket extending around the peripheral edges of the lens. A peripheral seal can also be applied in the first version to avoid oxygen and moisture ingress.

In another exemplary embodiment, electrochromic electrolyte precursor materials are provided as part of the film structure. In this regard, electrochromic electrolyte precursor material are applied to both lens elements over the EE or ECE coatings and are capable of lamination together to form a functional electrochromic electrolyte material sandwiched between the lenses.

In yet another exemplary embodiment, an electrochromic liquid or gel containing electrochromically active materials is sandwiched between two lenses having an ITO coating applied to the inner surfaces of the lenses using a simplified film construction having only the adhesive and ITO coatings.

Within the scope of the disclosure, the electrochromic electrode films can be provided separately from the lens elements. These films can be selectively trimmed and then applied to any lens substrate. In addition, the lens elements having the films applied can also be provided separately from a completed lens, and then used to construct customized lenses at the discretion of the manufacturer.

Accordingly, an objective is to provide a method of constructing an electrochromic lens which simplifies the steps of applying the electrochromic electrode coatings onto the lens elements.

Other objects, features and advantages shall become apparent as the description thereof proceeds when considered in connection with the accompanying illustrative drawings.

DESCRIPTION OF THE DRAWINGS

An exemplary embodiment will now be described further by way of example with reference to the following examples and figures, which are intended to be illustrative only and in no way limiting upon the scope of the disclosure.

DESCRIPTION OF THE EXEMPLARY EMBODIMENTS

Figure 1:
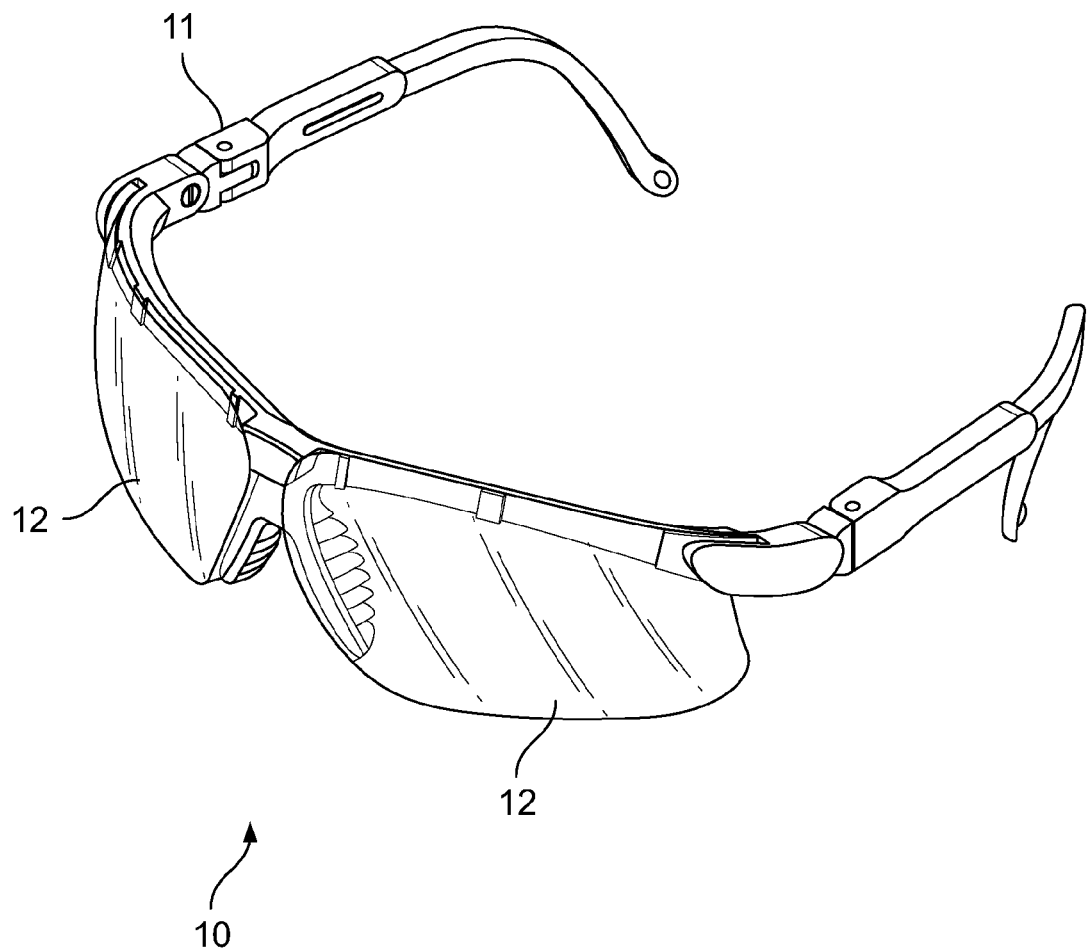
FIG. 1 is a perspective view of an exemplary embodiment of an eyewear incorporating the present electrochromic lens technology.

Referring now to the drawings, the present disclosure provides a method of constructing an electrochromic lens which simplifies the steps of applying the electrochromic electrode coatings onto the lens elements.

Referring to FIG. 1 there is shown an eyewear construction 10 having a frame 11 and including left and right electrochromic lenses 12 constructed in accordance with the teachings herein.

Figure 2:
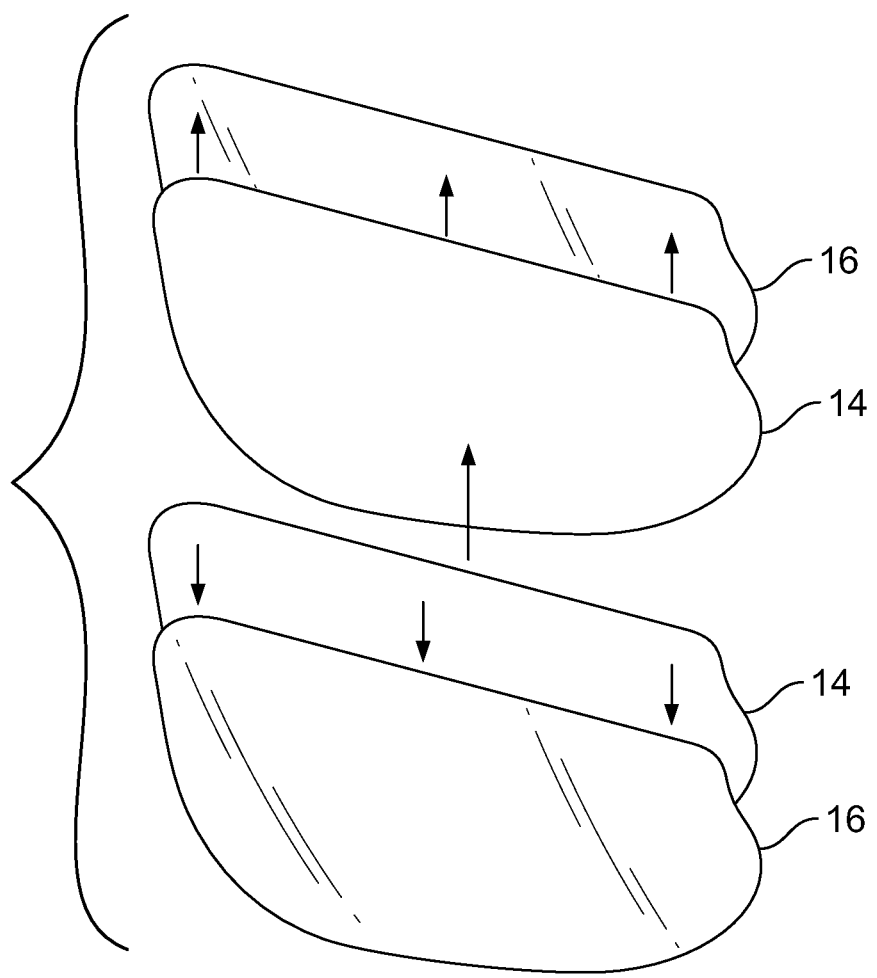
FIG. 2 is an exploded perspective view of an exemplary lens construction using two facing lens elements.
Figure 3:
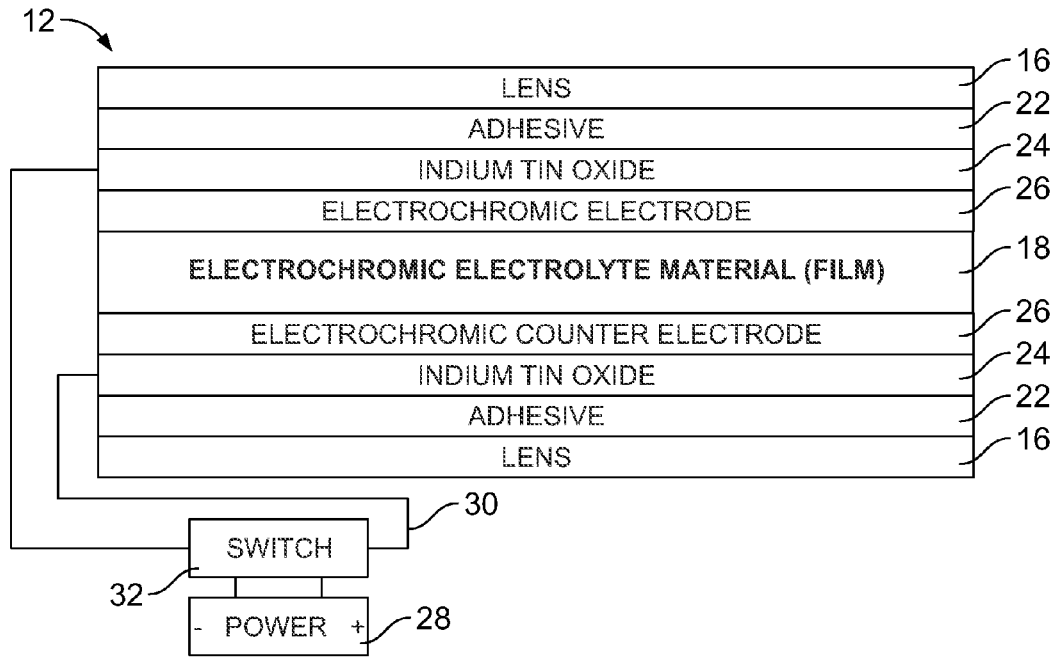
FIG. 3 is a schematic view of an exemplary embodiment of a complete lens construction using an electrochromic film material between the lenses.

Turning to FIGS. 2 and 3, an electrochromic lens 12 is constructed by applying complementary electrochromic electrode films 14 onto the inner surfaces of facing optical lens elements 16 and then sandwiching an electrochromic electrolyte material 18 between the lens elements 16.

For purposes of this disclosure, the term "electrochromic electrolyte material" is used to describe the collective electrochromic layers between the conductive electrodes. These layers typically include an electrochromic layer, such as tungsten oxide, an ion conductor/electrolyte and an ion storage layer. The material may be a solid, liquid or gel.

The optical lens elements 16 may preferably comprise a molded polycarbonate material common in safety eyewear, although any transparent substrate material may be used within the scope of the disclosure.

Figure 6:
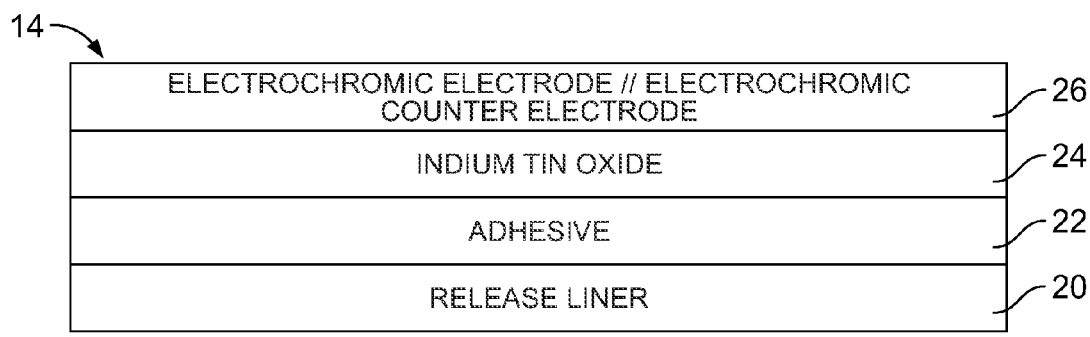
FIG. 6 is a schematic view of an exemplary embodiment of an electrode film used to construct the lenses of FIGS. 3 and 4.

Referring to FIG. 6, the films 14 include a release liner 20 having a release coating, an adhesive coating 22 overlying the release coating of the release liner 20, a transparent conducting oxide coating 24 (such as indium tin oxide (ITO)) overlying the adhesive coating, and an active electrochromic electrode (EE) coating or active electrochromic electrode (ECE) coating 26 overlying said ITO film coating 24.

The release liner 20 may comprise a low surface energy polymer film which is coated with a silicone release coating. Other polymer and paper liner materials and release coatings are also contemplated.

The adhesive coating 22 may comprise any compatible permanent contact adhesive material based on for example, acrylates, rubbers, silicones, ethylene vinyl acetate copolymers, or thermoplastic elastomers.

The electrochromic electrode materials 26 may comprise inorganic based coatings such tungsten oxide for the active electrochromic electrode (EE) and cerium-titanium oxide for the active electrochromic counter electrode (ECE) or organic based coatings, for example, redox active polymers such as polythipene and polyaniline.

Figure 5:
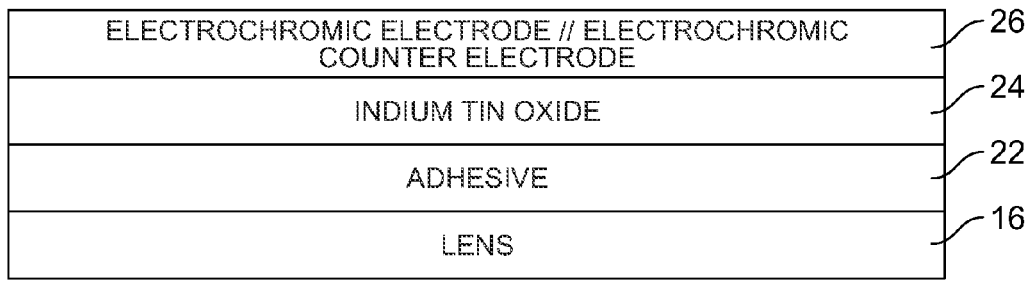
FIG. 5 is a schematic view of an exemplary embodiment of a lens element used to construct the lenses of FIGS. 3 and 4.

In use, the film 14 is trimmed to size, the release liner 20 is removed and the remaining layers of the film 22,24,26 are adhered to the lens element 16 resulting in a lens element as illustrated in FIG. 5.

As explained above, to form the completed lens an "electrochromic electrolyte material" 18 is sandwiched between two complementary lens elements, one having an electrode (EE) film and the other having a counter electrode (ECE) film (See FIG. 3).

The completed lens 12 is then assembled with an eyewear frame 11, and provided with a power source 28, an electrical circuit 30 connecting the power source with the electrochromic electrodes (EE and ECE) through the transparent conductor (indium tin oxide) layers, and a switch 32 for selectively energizing the lens 12 to modify the transmittance of the lens. A sensor (not shown) is also contemplated within the disclosure. In the embodiment shown in FIG. 3, the electrochromic electrolyte material is a solid film material.

Figure 4:
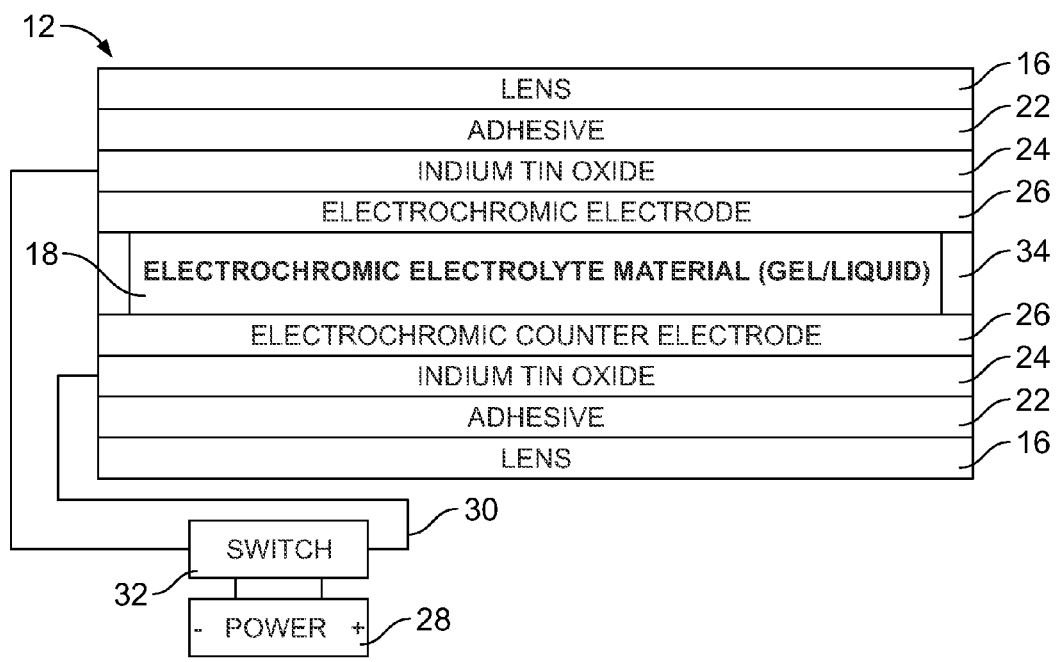
FIG. 4 is a schematic view of another exemplary embodiment using an electrochromic gel or liquid between the lenses.

Turning briefly to FIG. 4, a similar embodiment is illustrated except that the electrochromic electrolyte material 18 is a liquid or gel, and requires the use of a gasket 34 which extends around to peripheral edge of the lens elements 16 to seal the interior cavity and retain the electrolyte material 18 between the lens elements 16.

Figure 7:
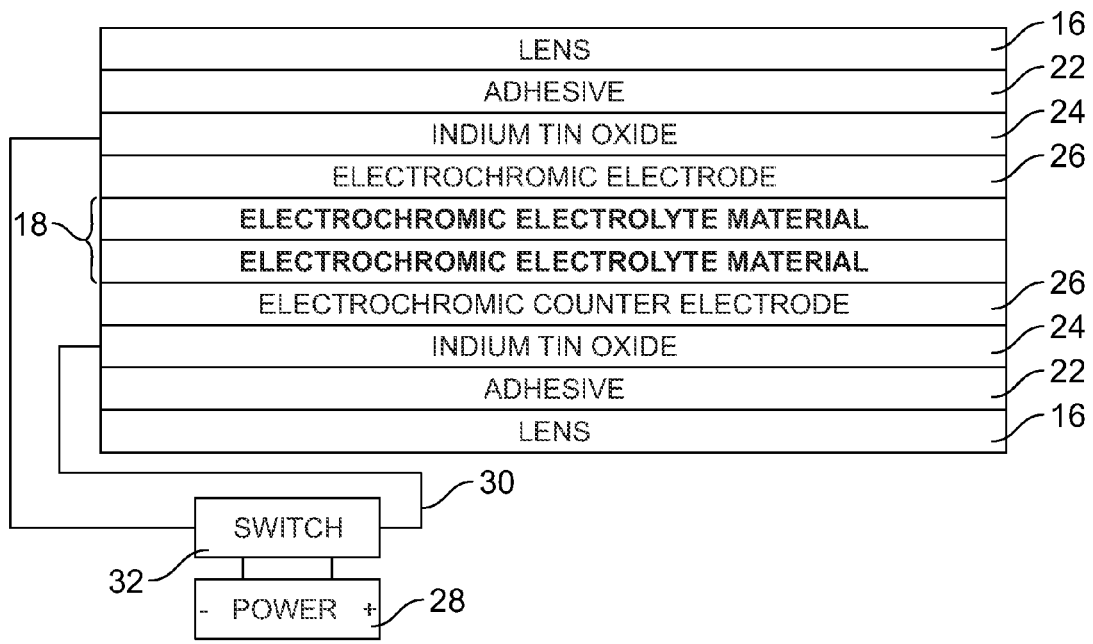
FIG. 7 is a schematic view of yet another exemplary embodiment using an electrochromic precursor material.
Figure 8:
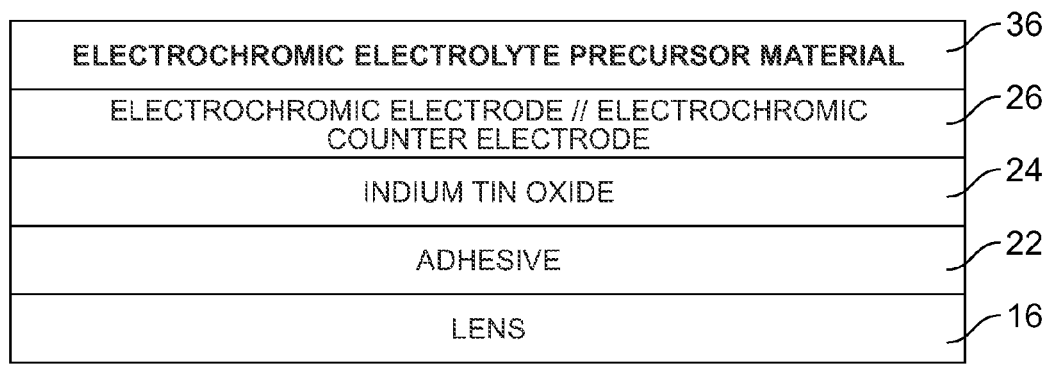
FIG. 8 is a schematic view of an exemplary embodiment of a lens element used to construct the lens of FIG. 7.
Figure 9:
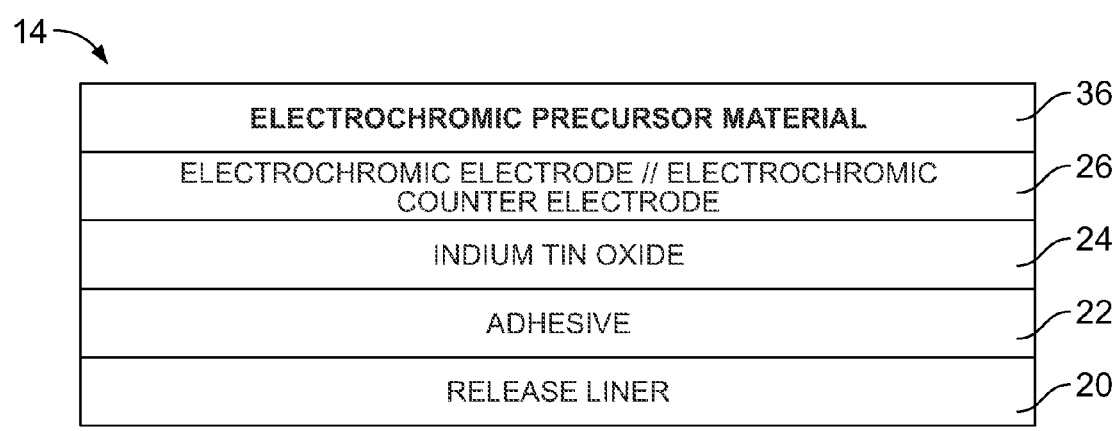
FIG. 9 is a schematic view of an exemplary embodiment of an electrode film used to construct the lens of FIG. 7.

In another exemplary embodiment illustrated in FIGS. 7-9, electrochromic electrolyte precursor materials 36 are provided as part of the electrode film structures 14. Referring to FIGS. 8 and 9, electrochromic precursor materials are applied to both lens elements 16 over the respective EE or ECE coatings 26 and are capable of lamination together to form a functional electrochromic electrolyte material 18 sandwiched between the lenses 16 (See FIG. 7).

Figure 10:
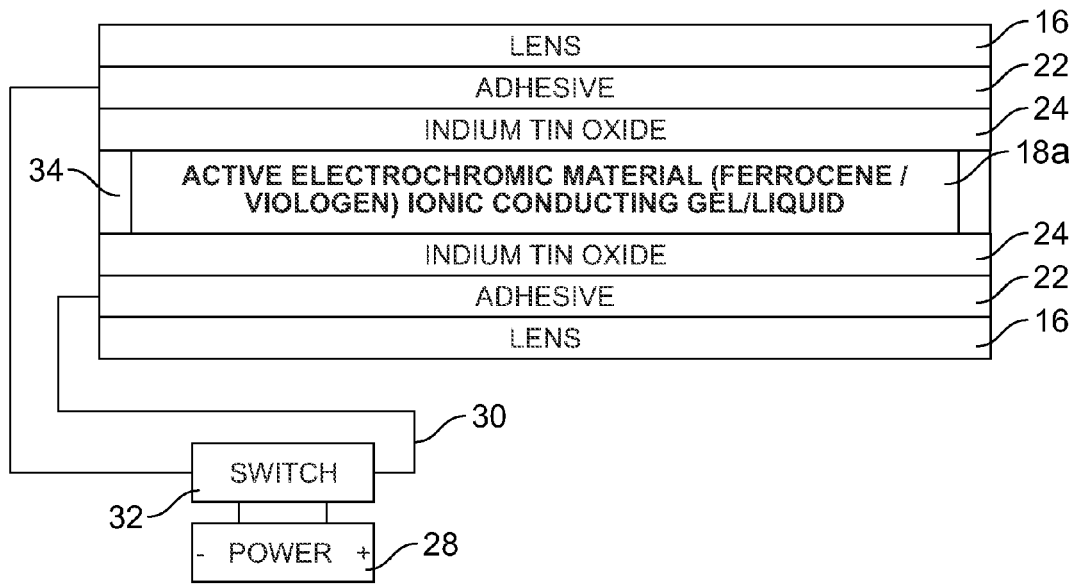
FIG. 10 is a schematic view of still another exemplary embodiment using an electrochromic active material and an ionic conductive gel or liquid.
Figure 11:
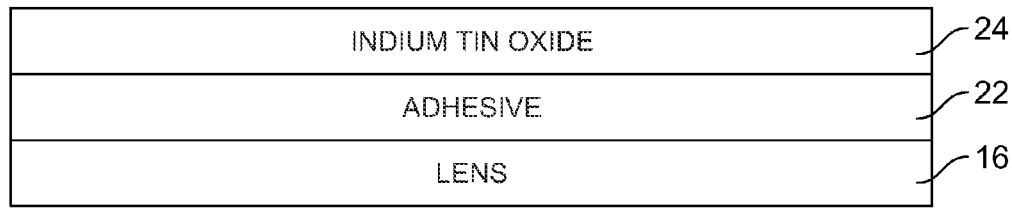
FIG. 11 is a schematic view of an exemplary embodiment of a lens element used to construct the lens of FIG. 10.
Figure 12:
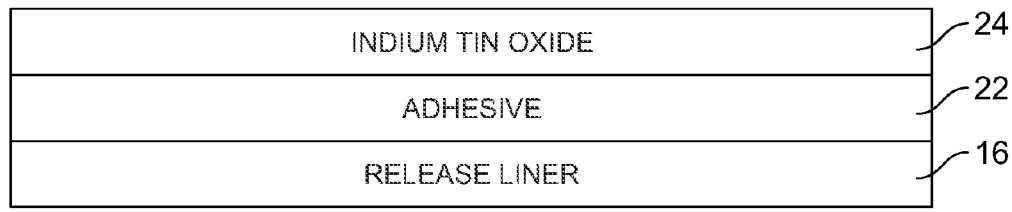
FIG. 12 is a schematic view of an exemplary embodiment of an electrode film used to construct the lens of FIG. 10.

In yet another exemplary embodiment illustrated in FIGS. 10-12, an electrochromic liquid or gel containing electrochromically active materials 18A is sandwiched between two lenses 16 having an ITO coating 24 applied to the inner surfaces of the lenses 16 (See FIG. 11) using a simplified film construction having only the adhesive layer 22 and ITO coating 24 (See FIG. 12).

It can therefore be seen that the present disclosure provides innovative electrochromic lens constructions and a method of constructing an electrochromic lens which simplifies the steps of applying the electrochromic electrode coatings onto the lens elements.

For these reasons, exemplary embodiments described herein are believed to represent a significant advancement in the art which has substantial commercial merit.

While there is shown and described herein certain specific structure embodying the exemplary embodiments, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An electrochromic eyewear lens comprising:
   a first optical lens having an inner surface, an indium tin oxide (ITO) coating overlying said inner surface, an active electrochromic electrode (EE) coating overlying said ITO coating, and an adhesive material disposed between said ITO coating and said inner surface to adhere said ITO coating, with said active EE coating, to said inner surface, said adhesive material further comprising a removable release liner;
   a second optical lens having an inner surface, an indium tin oxide (ITO) coating overlying said inner surface, an active electrochromic counterelectrode (ECE) coating overlying said ITO coating, and an adhesive material disposed between said ITO coating and said inner surface to adhere said ITO coating, with said active ECE coating, to said inner surface, said adhesive material further comprising a removable release liner;
   wherein said active EE coating comprises tungsten oxide and said active ECE coating comprises cerium-titanium oxide;
   said first and second optical lenses being arranged in adjacent relation with said EE coating and said ECE coating arranged in closely spaced facing relation;
   an electrochromic material sandwiched between said EE coating and said ECE coating, said electrochromic material comprising a liquid or gel electrolyte;
   a gasket extending around a peripheral edge of the electrochromic material layer;
   said sandwich of adhesive material, ITO coating, EE coating, electrochromic material, ECE coating, ITO coating, and adhesive material forming an electrochromic element;
   a power source; and an electrical circuit connecting said EE coating and said ECE coating with said power source for selectively applying power across said electrochromic material;

whereby said electrochromic element is trimmable to size of said first optical lens and said second optical lens, and said release liners are removed prior to adhering said ITO coating to said inner surface of said first optical lens and said second optical lens, respectively.

2. The electrochromic eyewear lens of claim 1, wherein said release liners each comprise a polymer film having a release coating.

3. The electrochromic eyewear lens of claim 2, wherein said release coating is a silicone release coating.

* * * * *